United States Patent
Berstis et al.

(10) Patent No.: US 7,437,381 B2
(45) Date of Patent: Oct. 14, 2008

(54) RAPID ACCESS TO PARTS OF AN ELECTRONIC DOCUMENT VIA GUI

(75) Inventors: Viktors Berstis, Austin, TX (US); Randolph Michael Forlenza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/032,874

(22) Filed: Jan. 11, 2005

(65) Prior Publication Data
US 2006/0173891 A1 Aug. 3, 2006

(51) Int. Cl.
*G06F 17/30* (2006.01)
(52) U.S. Cl. .......................... 707/102; 707/10
(58) Field of Classification Search ................ 707/1–10, 707/100–104.1, 200–206; 709/203; 713/200; 715/811, 814, 815, 817
See application file for complete search history.

(56) References Cited

U.S. PATENT DOCUMENTS

2001/0056463 A1* 12/2001 Grady et al. ................ 709/203
2002/0184159 A1* 12/2002 Tadayon et al. .............. 705/54
2003/0074369 A1* 4/2003 Schuetze et al. ........ 707/103 R

* cited by examiner

*Primary Examiner*—Diane Mizrahi
(74) *Attorney, Agent, or Firm*—Casimer K. Salys; Schubert Osterrieder & Nickelson PLLC

(57) ABSTRACT

Methods, systems, and media are disclosed for accessing one or more parts of an electronic document. In one embodiment, the method includes choosing, with a selecting device, the electronic document, and for receiving document utilization information for the electronic document. Further, the method includes displaying, on the computer, the electronic document and the document utilization information as an interactive graphical representation comprising a set of points, wherein each point in the set corresponds to both a different part of the electronic document and any of the document utilization information associated with the different part. Further still, the method includes selecting, with the selecting device, at least one point in the set, and opening, on the computer, to the part of the electronic document associated with the point selected by the selecting device.

20 Claims, 5 Drawing Sheets

RAPID ACCESS TO PARTS OF AN ELECTRONIC DOCUMENT VIA GUI

CROSS-REFERENCE TO RELATED APPLICATIONS

Related subject matter is found in both a co-pending U.S. patent application Ser. No. 11/032,871, filed Jan. 11, 2005, entitled "SYSTEMS, METHODS, AND MEDIA FOR AGGREGATING ELECTRONIC DOCUMENT USAGE INFORMATION," invented by inventors herein and assigned to Assignee hereof, and a co-pending U.S. patent application Ser. No. 11/032,872, filed Jan. 11, 2005, entitled "SYSTEMS, METHODS, AND MEDIA FOR UTILIZING ELECTRONIC DOCUMENT USAGE INFORMATION WITH SEARCH ENGINES," invented by inventors herein and assigned to Assignee hereof, wherein the disclosures of both are incorporated herein in their entirety for all purposes.

BACKGROUND

Personal computer (PC) systems are well known in the art. PCs are widely used for providing computer power to many segments of today's modem society. PCs may be a desktop, floor standing, or portable microcomputer that includes a system unit having a central processing unit (CPU) and associated volatile and non-volatile memory, including random access memory (RAM) and basic input/output system read only memory (BIOS ROM). Further, PCs may include a system monitor, a keyboard, one or more flexible diskette drives, a CD-ROM drive, a fixed disk storage drive (also known as a "hard drive"), a pointing device such as a mouse, and an optional network interface adapter. Examples of such personal computer systems are IBM's PC 300™, ThinkCentre™, ThinkPad®, Aptiva®, and IntelliStation® series.

Within the last few years, mobile computing devices have become mobile. Examples of commonly used mobile computer devices include notebook PCs, personal digital assistants (PDAs), sophisticated wireless phones, etc. When compared to traditional PCs, however, mobile computing devices typically exchange some functionality or performance in exchange for their smaller size, portable power, and mobility.

Widespread usage of PCs, whether stationary or mobile, has rendered society's ubiquitous reliance on them, such as for telecommuting, news, stock market information, trading, banking, shopping, shipping, communication in the form of hypertext transfer protocol (http) and e-mail, as well as many other services. Many of these services take advantage of the communication abilities offered by and through connection with the Internet. Such connectivity has facilitated unprecedented amounts of collaboration and sharing of information between individuals, whether within an organizational structure or not. This collaboration has resulted in individuals having access to and sharing vast amounts of information, often in the form of electronic documents.

Capable of being read by various computer systems, electronic documents are digitized documents that contain text, graphics, photographs, etc. Electronic documents may exist in a wide variety of file formats, such as Portable Network Graphics (PNG), Joint Photographic Experts Group (JPEG), Graphics Interchange Format (GIF), Tag Image File Format (TIFF), Microsoft Word (DOC), etc. Other file formats capable of handling text and graphics include Hypertext Markup Language (HTML) and Adobe Systems Inc.'s Portable Document Format (PDF). For many purposes, electronic documents, particularly PDF documents, have supplanted printed material for the dissemination of information, as many journals, newsletters, books, articles, etc., now distribute exclusively in electronic format.

While electronic documents possess improved qualities in many ways over hardcopies, such as cost, easy of distribution, and time to prepare, disadvantages exist. One deficiency of electronic documents is that it is difficult to find the most interesting or useful part of an electronic book or other document. With paper books, individuals may observe which pages are the most worn or the pages to which the book naturally opens due to frequent reading of those pages. For example, one can easily discern which book in a library is the most useful based on its wear. Additionally, one can also often find the most useful part of the book by noting the wear caused by frequent reading. Because of their fixed nature electronic documents fail to provide such indications of frequently read or particularly useful sections of the document.

There is, therefore, a need for methods, systems and media that enable rapid access to salient parts of an electronic document, which further assists readers by minimizing their invested time in order to ascertain the useful and/or salient parts of the electronic document.

SUMMARY OF THE INVENTION

Embodiments of the invention generally provide methods, systems, and media for accessing one or more parts of an electronic document. In one embodiment, the method includes choosing, with a selecting device, the electronic document, and receiving document utilization information for the electronic document. Further, the method includes displaying, on the computer, the electronic document and the document utilization information as an interactive graphical representation comprising a set of points, wherein each point in the set corresponds to both a different part of the electronic document and any document utilization information associated with the different part. Further still, the method includes selecting, with a selecting device, at least one point in the set, and opening, on the computer, to the part of the electronic document associated with the point selected by the selecting device.

In another embodiment, the invention provides a system for accessing one or more parts of an electronic document. In one embodiment, the system includes an access module for receiving document utilization information for the electronic document. Further, the system includes a display module, in communication with the access module, for choosing, with a selecting device, an electronic document and for displaying the electronic document and the document utilization information as an interactive graphical representation having a set of points after associating each point in the set to both a different part of the electronic document and any of the document utilization information associated with the different part. Further still, the system includes an input module, in communication with the display module, for selecting, with a selecting device, at least one point in the set, and a visualization module, in communication with the input module, for opening, on the computer, the part of the electronic document associated with the point selected by the selecting device.

In yet another embodiment, the invention provides a machine-accessible medium containing instructions for accessing one or more parts of an electronic document. In one embodiment, the instructions generally include operations for choosing, with a selecting device, the electronic document, and for receiving document utilization information for the electronic document. Further, the instructions include operations for displaying, on the computer, the electronic document and the document utilization information as an interactive graphical representation comprising a set of points, wherein each point in the set corresponds to both a different part of the electronic document and any of the document utilization information associated with the different part. Further still, the instructions include operations for selecting, with a selecting device, at least one point in the set, and opening, on the computer, the part of the electronic document associated with the point selected by the selecting device.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE EMBODIMENTS

The following is a detailed description of example embodiments of the invention, a description further enhanced by the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for accessing one or more parts of an electronic document are contemplated. As previously discussed, today, electronic documents exist in a wide variety of formats, e.g., pdf, doc, wpd, tiff, ged, lpd, xcl, and many more. Regardless of the format, when a reader conventionally opens an electronic document, it opens to the first page—just like when a reader opens to the first page of a paperback novel. However, sometimes, a current reader of an electronic document wishes to read only the most useful, used or salient pages, sections, etc. (collectively, "parts") of an electronic document, as determined by accessible document utilization information (DUI), because, for one, reading the entire electronic document, especially in business situations, may unnecessarily waste time. The most used parts of the electronic document are determined by tracking and collecting data based on previous readers' usage of parts of the electronic document. Now, when a current reader accesses this electronic document, then the reader also the accesses document utilization information associated with this electronic document.

The point of this invention is to translate any type of electronic document into an interactive graphical representation (IGR), which is displayed as a graphical user interface (GUI) on a computer. Each point, whether a dot, a slash, a bar, or other demarcation, on the interactive graphical representation directly correlates to only one part of the electronic document. Further, these points may also have document utilization information, which tells a user, i.e., a reader, about the most used and/or useful parts of the electronic document. When a reader selects, with a selecting device, such as a mouse or keyboard, one of these points on the interactive graphical representation, then the electronic document does not conventionally open on the computer to the first part of the electronic document; instead, it opens to the part of the electronic document that corresponds to the selected point on the interactive graphical representation.

Figure 1:
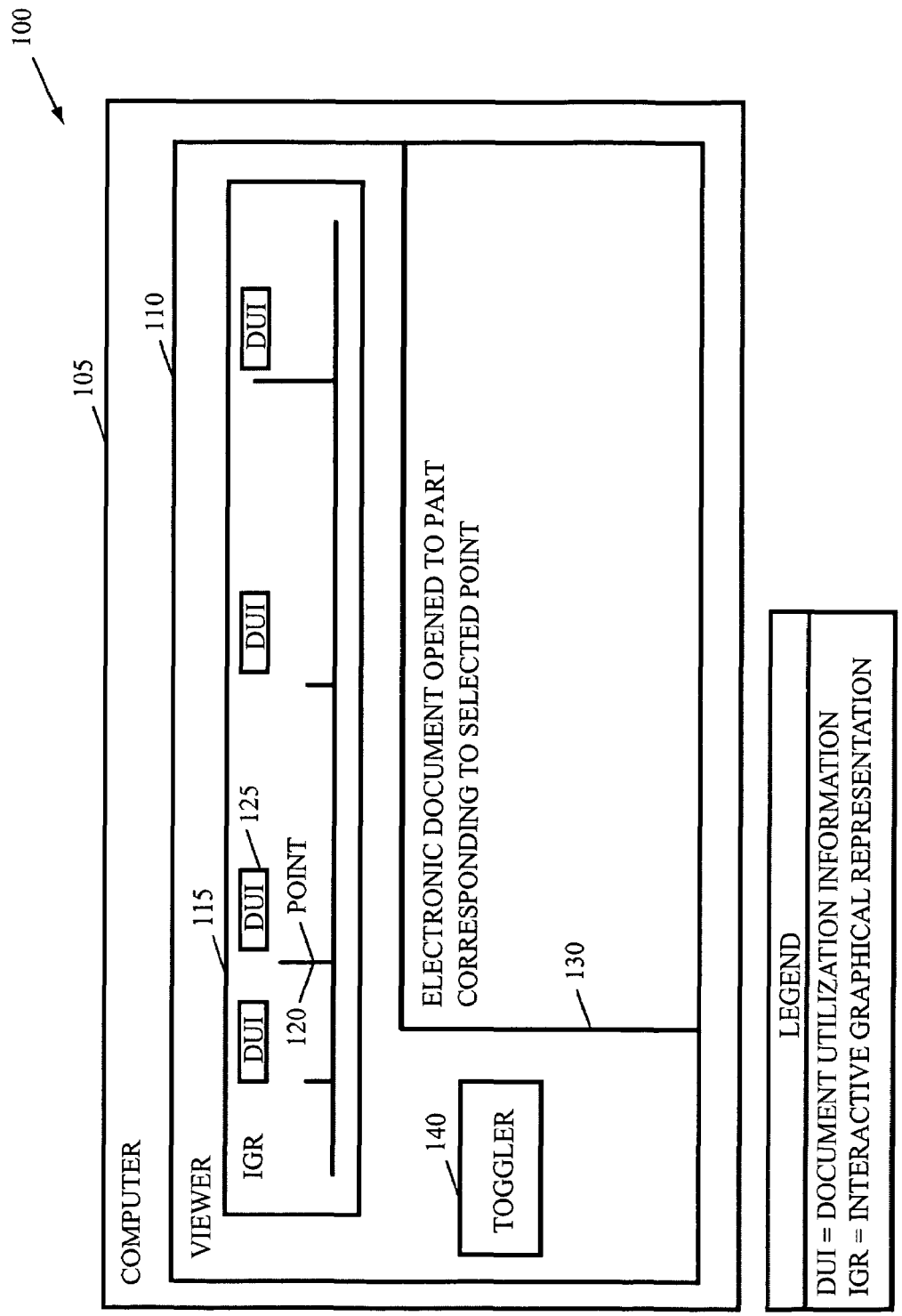
FIG. 1 depicts an example embodiment of a GUI display for accessing one or more parts of an electronic document in accordance with the disclosed invention.

Turning to FIG. 1, an example embodiment of a GUI display 100 for accessing one or more parts of an electronic document 130, in accordance with the invention, is depicted. FIG. 1 shows a computer 105 having a viewer 110, such as a monitor or screen. On the viewer 110 is an interactive graphical representation (IGR) 115 of an electronic document 130 and its document usage information (DUI) 125, both of which are accessed and received by the computer 105 from, for instance, a non-depicted server in network communication. Although the current discussion involves the GUI display 100, later discussion explains the translation and representation of an electronic document 130 into an IGR 115. Returning to FIG. 1, the IGR 115 is depicted as an interactive bar graph having a plurality of points, such as vertical bar 120, indicating a part of the translated electronic document 130 having an associated DUI 125. Further, the size of a point, such as the height of vertical bar 120, directly corresponds to the amount of utility associated with this point. That is, for example, vertical bar 120 is taller than two other vertical bars appearing in FIG. 1 because previous readers found, as determined by the associated DUI, that vertical bar 120 is a more useful part of the electronic document 130 than either of the two parts of the electronic document 130 represented by the two smaller vertical bars appearing in FIG. 1.

The associated DUI 125 for a point, such as vertical bar 120, may appear as a permanently displayed window with a brief description or notes about the associated part in the electronic document 130. Alternatively, the associated DUI 125 for a point, such as vertical bar 120, may appear as a pop-up window that appears when a selecting device, such as a mouse, is moved over the IGR 115 and near a point, such as vertical bar 120. As yet another alternative, a reader may use a toggler 140, for instance, by iteratively clicking with a mouse on the toggler 140 to move among the various points, such as vertical bar 120, found on the IGR 115.

Whether selecting a particular point, such as vertical bar 120, on the IGR 115 with a mouse by singly or multiply clicking, or by single or multiple keyboard entries from a menu providing selection options, upon selecting a point, such as slash 120, the electronic document 130 opens directly to the part of the electronic document 130 associated with the selected point. As a result opening of the electronic document 130 allows the reader to instantly access a part of the electronic document 130 associated with high usage as determined by its associated document utilization information.

Figure 2:
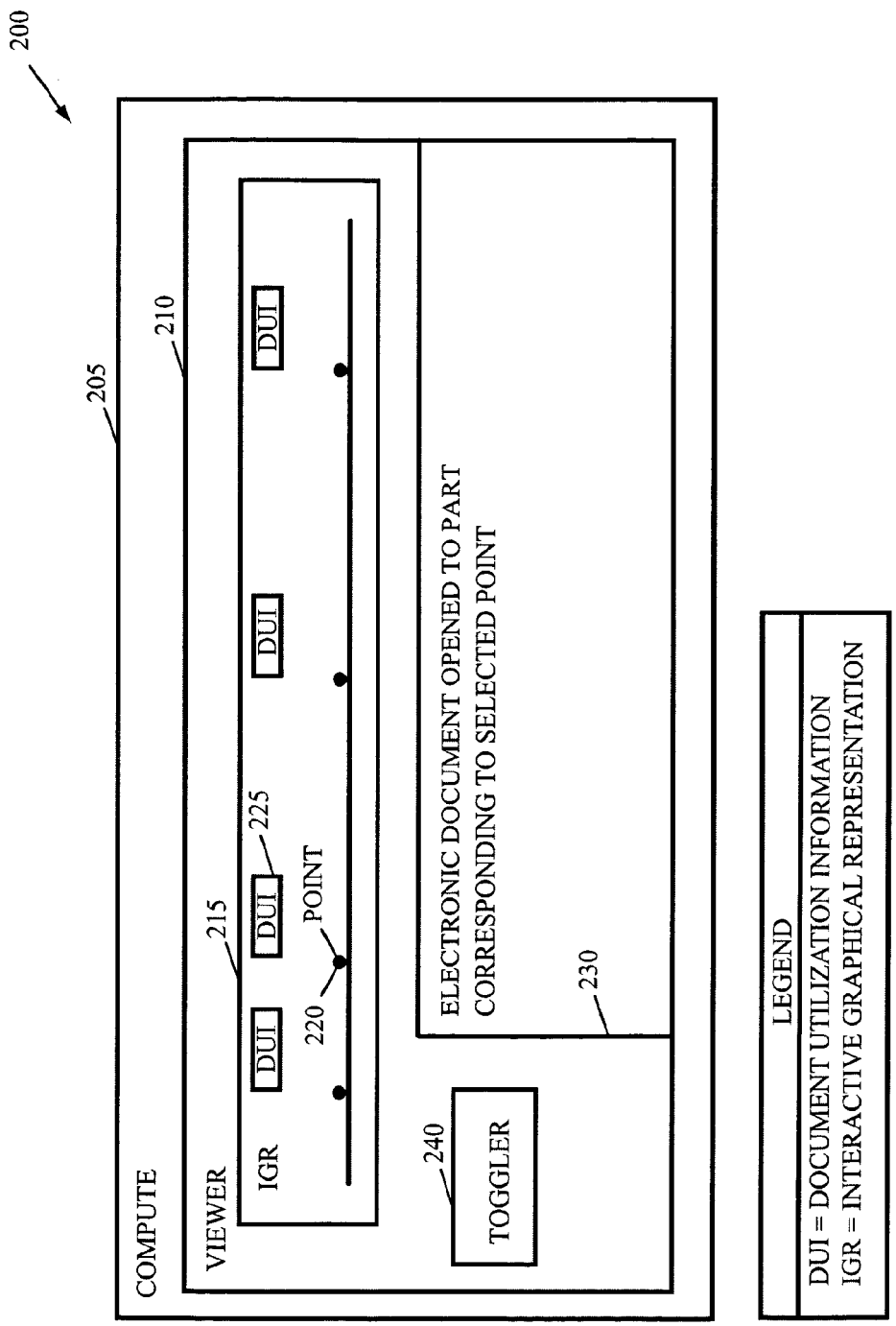
FIG. 2 depicts another example embodiment of a GUI display for accessing one or more parts of an electronic document in accordance with the disclosed invention.

Turning now to FIG. 2, another example embodiment of a GUI display 200 for accessing one or more parts of an electronic document 230, in accordance with the invention, is depicted. FIG. 2 differs from FIG. 1 only the type of graph representing the parts of the translated electronic document 230. In FIG. 2, rather than having the bar graph as found in FIG. 1, FIG. 2 uses an interactive graph having dots, wherein each selectable dot, such as dot 220, represents a part of the electronic document 230 having an associated DUI, such as DUI 225. Again, as in FIG. 1, the size of the dots in FIG. 2 may directly correspond to the increased utility of the DUIs on the IGR 215. As is easily imagined, the particular graph used for displaying the translated electronic document 230 may be any that clearly depicts the parts of the electronic document 230 having associated DUIs. For instance, another non-depicted example may be to depict the translated electronic document 230 as an interactive histogram. Another non-depicted example may be to display the translated electronic document 230 as either a white-gray-black, or more and different colors, wherein the different colors correspond to different amount of utility for particular parts of the electronic document 230. In the white-gray-black example, white may correspond to no associated DUI for a point, gray may refer to some small amount of associated DUI for a part of the electronic document 230, and black may correspond to a high amount of associated DUI for a particular part of the electronic document 230. A legend explaining the color scheme may optionally appear on some of the viewer's 210 real estate. Speaking of real estate, it is noted that IGR 215, like FIG. 1's IGR 115, occupies a small portion of the overall real estate of the viewer 210. Although the size could be larger or smaller in alternative embodiments, a relatively small size is preferred in order to maximize the amount of real estate available for the electronic document when it opens after a user selects a particular point on the IGR 215. Furthermore, by operating a small part of the viewer's 210 real estate, display of more than one translated electronic document is possible for depiction on the viewer 210 for similar interaction, as previously described, by a user.

Figure 3:
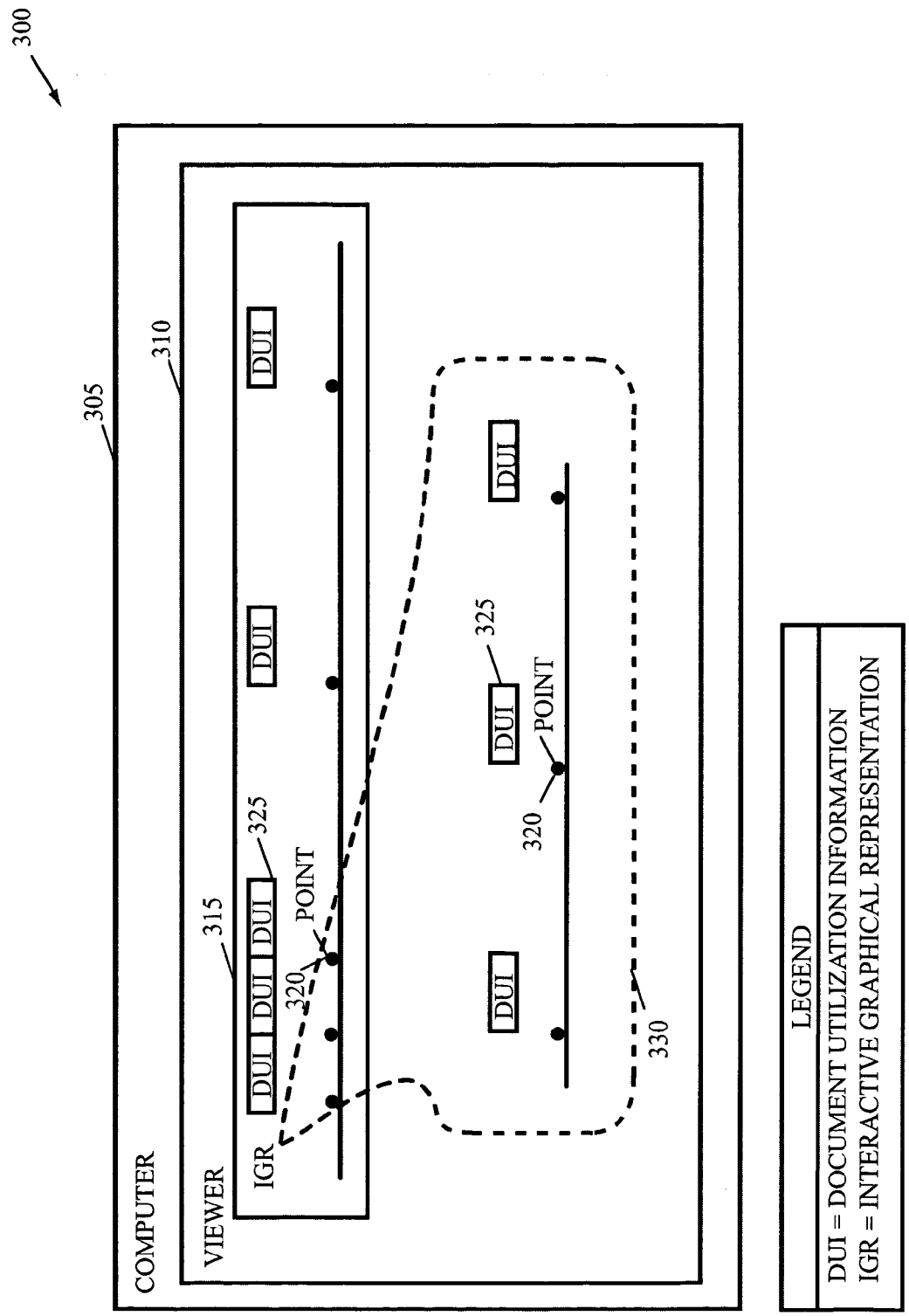
FIG. 3 depicts another example embodiment of a call out of a GUI display for accessing one or more parts of an electronic document in accordance with the disclosed invention.

Moving on to FIG. 3, a particular function for GUI display 300, in accordance with the invention, wherein the same function is also optionally associated with GUI displays 100, 200. Although not drawn to scale, FIG. 3 shows the results 300 of a call out function selected in order to magnify at least one section of the interactive graphical representation of an electronic document in order to increase the section's granularity. As shown in FIG. 3, three parts of the translated electronic document are particularly crowded, which makes it difficult for a reader to clearly see the points and their associated DUIs on the particular interactive graphical representation of the electronic document. By selecting, for example, by right mouse clicking on the interactive graphical representation and dragging the mouse to another point on the interactive graphical representation before clicking again, the results 300 for a call out function are depicted on the viewer 310. As shown in FIG. 3, the granularity of three points, one being point 320, and their associated DUIs are now clearly depicted for a reader. For example, selecting by clicking and holding on point 320 could cause display of a pop-up window, which magnifies the section having points in a predetermined proximity to a particular point 320. In such an embodiment, the three points, including point 320, may appear in the pop-up window.

Figure 4:
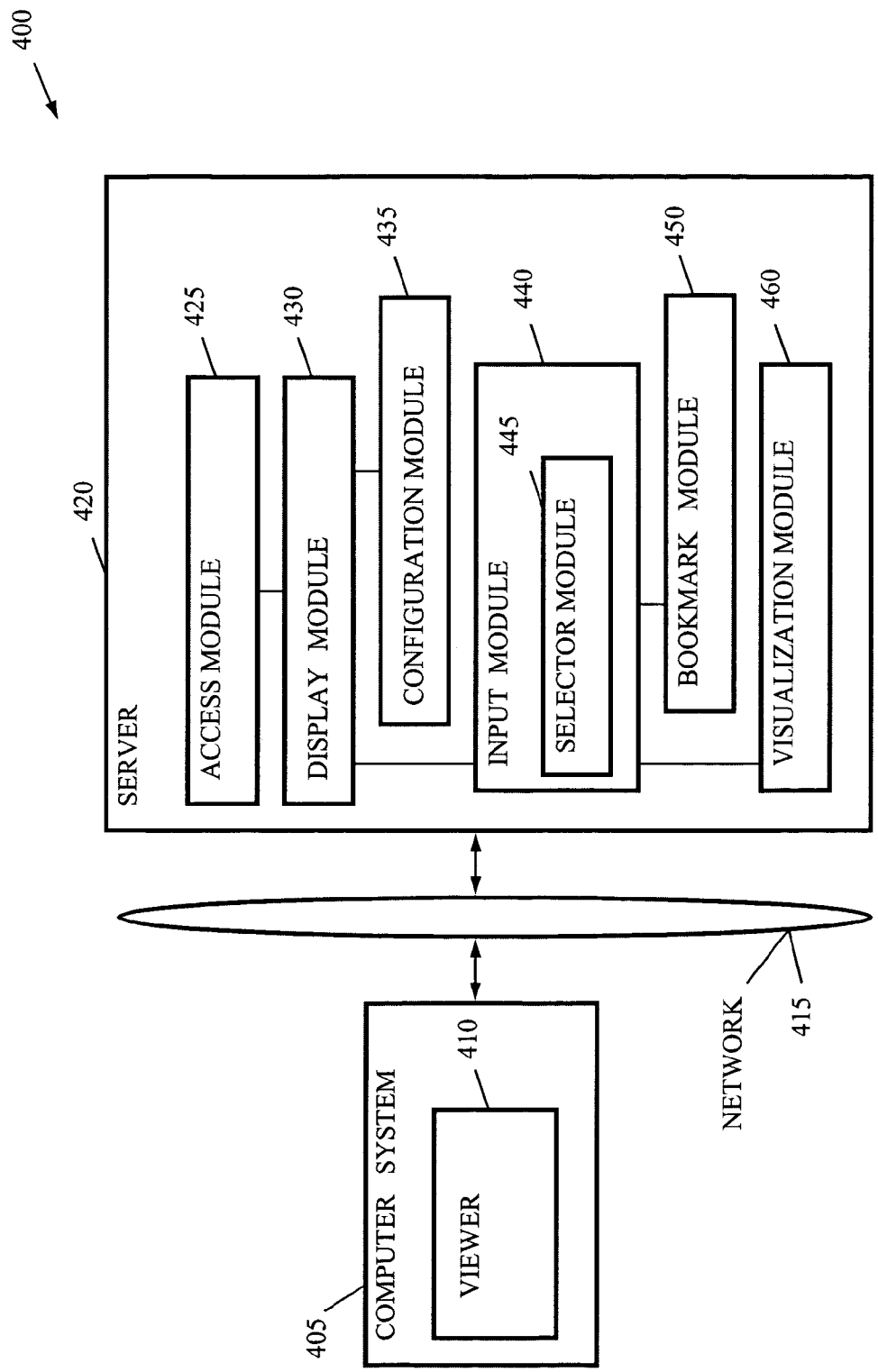
FIG. 4 depicts an example embodiment of a system for accessing one or more parts of an electronic document in accordance with the disclosed invention.

Turning now to FIG. 4, a system 400 for accessing one or more parts of an electronic document, in accordance with the invention, is depicted. The system 400 includes a computer 405, having associated logical and physical peripherals, such as a mouse, keyboard, memory, cpu, and a viewer 410 just to name a few. The computer 405 is in network communication, such as through a LAN or WAN, with a server 420, which is also likely accessible by other computers or different users of the computer 405.

Enabled by logic in software and/or hardware, server 420 includes an access module 425 for accessing document utilization information for an electronic document selected for display by a user via the input module 430. The access module 425 communicates with one or more modules associated with the server in order to retrieve the associated document utilization information for the selected electronic document. The associated one or more modules include modules for tracking, collecting, and aggregating the document utilization information, which arises from previous uses' use and/or commentary about different parts of the particular electronic document.

In communication with the access module 425 is an input module 440. Enabled by logic in software and/or hardware, the input module 440 provides the user of the computer 405 with, for example, a selectable file structure representing the electronic documents available for selectively viewing, or a text box through which the user may type in the electronic document's filename, or other interface for the user to select the particular electronic document that is accessible by the computer's 405 communication with the server 420. After the user selects at least one electronic document for displaying, further enabling logic, found in software and/or hardware, associated with the visualization module 460 actually displays the selected electronic document as an interactive graphical representation to the user.

In a default configuration, the display module 430 may permit display of the selected electronic document as an interactive graphical representation, having associated document usage information for predetermined parts of the electronic document, as determined, for example, by a system administrator through use of the associated configuration module 435. However, a user of the system 400, may also and optionally have access to the configuration module 435. Through this access, further enabling logic may permit a user to configure the appearance of the interactive graphical representation for the electronic document. For instance, a user or the system administrator, through use of the configuration module 435, may decide that display of the electronic document should be visualized as a bar graph, a histogram, or a colorized graph, and so on. Further, the configuration module 435 may allow selection of the colors to use for the points of the electronic document, wherein each color, comprised of pixels, represents a different intensity or amount of utilization for the document utilization information associated with a particular part of the electronic document. In addition, the configuration module 435 may allow the user to determine representation of parts of the translated electronic document on the interactive graphical representation. That is, a user may wish to use bars, dots, squares, peaks, etc. (collectively, "points"), wherein the size or height of each point corresponds to a different amount of utilization for the document utilization information associated with a particular part of the electronic document. The configuration module 435, may also allow the user to select which points should have their associated DUIs appear, such as by the user setting a minimum threshold of document utilization.

Further logic associated with the configuration module 435 permits configuring the appearance of the document usage information (DUI) associated with points, wherein each point represents a different part of the electronic document. For instance, the user may configure the DUIs to appear as stationary windows with the descriptive information adjacent to each point corresponding to the proper point on the interactive graphical representation. As another example, the user may configure the DUIs to appear as pop-up windows. The DUI for a particular point pops-up when, for example, a selecting device, such as a mouse, is moved within a proximal distance to a point on the interactive graphical representation of the electronic document. Regardless how configured, it is re-iterated that the display module's 430 associated logic translates each part of the electronic document into points on an interactive graphical representation. In addition, the display module's 430 logic also correlates the document usage information received from the access module 425 to each point having any associated document usage information. Afterwards, the visualization module 460 permits actual display of the configured or default interactive graphical representation of the electronic document with document utilization information.

The input module 440 includes further enabling logic reduced to hardware and/or existing in code for determining how selection of points and parts of the interactive graphical representation occurs. The input module 440 has default configurations for determining how a user selects the points and parts, such as by clicking with a mouse on a point to instantly display the corresponding part of the electronic document. Instead of single-clicking, the input module 440 may require a user to double-click on a point to instantly open the electronic document to the corresponding part of the electronic document, and a single click may make the hidden point appear as determined by the configuration module 435. In addition or as another alternative embodiment, the input module 440 permits the user to use a toggling function to toggle between the points having associated DUIs on the interactive graphical representation. By using the toggler, the user may see a point's associated DUI by, for example, right-mouse clicking once the toggler lands the user on a particular point. The user may actually select a part of the electronic document corresponding to a toggled-to-point by possibly double-clicking or even selecting from a choosing from a selection menu that pops up by the right-mouse clicking. As still another alternative or additional embodiment, the input module 440 permits selection through a user's interaction with a menu using a keyboard and/or mouse as the selecting device. Yet another and alternative embodiment of selecting allows the user to magnify a chosen section of the interactive graphical representation in order, ostensibly to improve the granularity of that section, such as the section 330 depicted in FIG. 3, by choosing the section with a selecting device. In order to change these above-explained default selection configurations of the input module 440 permitting selecting, a user make use of the selector module 445 to re-configure any and all default selection settings in much the same way the user would interact with the configuration module 435 for display by the display module 430.

A final module of the system 400 includes a bookmark module 450, which has enabling logic reduced to hardware and/or code for a user to bookmark one or more DUIs that a particular user may find most useful. For instance, if the user's computer 405 received a copy of all DUIs for the entire electronic document, then the bookmark module 450 may permit the user to bookmark, with a selecting device, one or more DUIs into this copy for latter, convenient usage by the user. By the bookmark module 450 storing the bookmarked copy in memory associated with the bookmark module 450, then the personalized, i.e., bookmarked, copy of the DUIs for the electronic document is available for the user to later access by re-communicating with the bookmark module 450 of the system 400.

Another example embodiment of a system for accessing one or more parts of an electronic document, in accordance with the invention, is disclosed, but not depicted because of its similarity to system 400 depicted in FIG. 4. In this additional embodiment, the server 420 and network 415 shown in FIG. 4 are not present. Instead, modules 425, 430, 435, 440, 445, 450, and 460 are optionally included and found on the computer system 405 having the viewer 415. In short, this alternative and additional example embodiment is a stand alone system.

Figure 5:
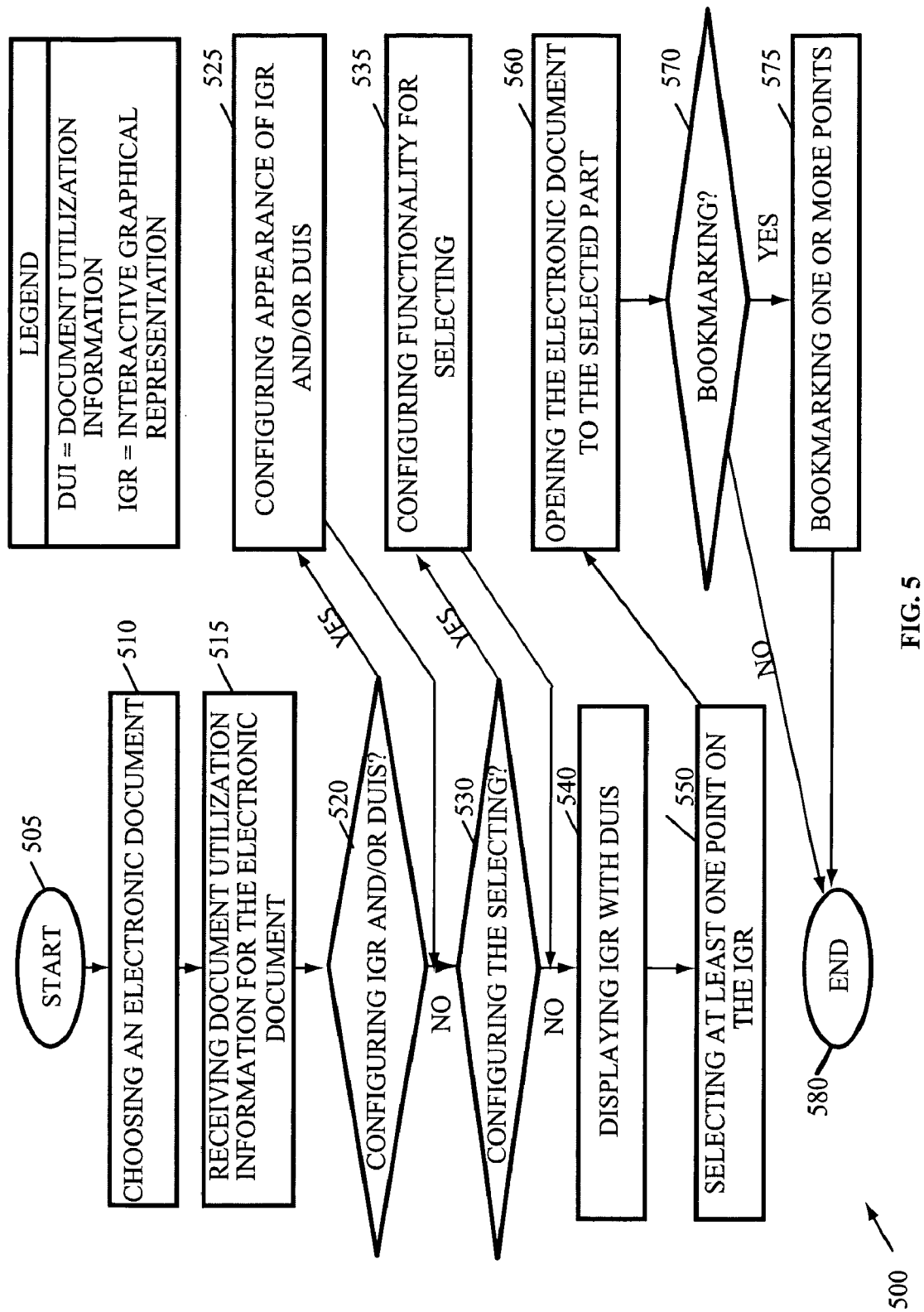
FIG. 5 depicts an example embodiment of a flowchart for accessing one or more parts of an electronic document in accordance with the disclosed invention.

Now, moving to FIG. 5, a flowchart 500 for accessing one or more parts of an electronic document is depicted for a system such as system 400 in FIG. 4 or the stand-alone system just discussed that is similar to FIG. 4. For sake of discussion, the following discussion is made reference to the system depicted in FIG. 4, but it is understood that the flowchart 500 equally applies to the stand-alone version. Flowchart 500 begins at START 505 by a user choosing 510 an electronic document for viewing on a viewer, such as a monitor, associated with a user's computer. The user's computer is in communication, likely via a network, with a server having the electronic document available for viewing by the user on the user's viewer. The electronic documents available for a user to view may appear as an interface, such as a list, from which the user selects with a selecting device, such as a mouse or a keyboard entry. Instead of a list, however, different enabling logic may simply query the user with a box to enter the name or filename of the electronic document that the user wishes to see on the viewer associated with the user's computer.

After the user chooses 510 the electronic document from possibly a library of electronic documents on the server, the server receives 515 the document utilization information (DUI) associated with the chosen electronic document. Through enabling logic reduced to hardware and/or found in code, the server may receive 515 the DUI for the chosen electronic document by, for instance, making a call to another module or modules associated with the server for tracking, collecting and aggregating the DUI for the chosen electronic document. In addition, the user's computer may also receive 515 a copy of the DUI for the chosen electronic document, wherein the copy is utilized in the bookmarking 560 aspect of the flowchart 500 as later described.

Before displaying 540 the chosen electronic document as an interactive graphical interface ("IGR") with the individual DUIs associated with the individual points on the IGR, flowchart 500 shows decision block 520. If a user decides not to configure 520 the IGR and its associated DUIs, then the user is accepting the default configurations of the IGR and its associated DUIs. However, if the user does opt to configure 520 the IGR and/or its associated DUIs, then configuring 525 the appearance of the IGR and/or its associated DUIs ensues. Configuring 525 the IGR involves the user selecting the type of interactive graph for eventual display of the IGR. That is, through enabling logic, the user chooses whether to depict, for instance, the IGR as a bar graph, histogram, or even a colorized graphical representation of the electronic document. Further, the user selects whether the points of the electronic document, wherein each point corresponds to a different part of the electronic document, should appear as bars, dots, circles, squares, or as one or more colors on the IGR. Further still, the user selects whether the DUIs associated with a particular point should appear, for example, as permanently displayed or pop-up windows on the IGR, and where on or near the points on the IGR the DUIs associated with each point should appear. For example, the user may decide that the DUIs should appear adjacent to the corresponding point, or should appear beneath the corresponding point, and so forth. Additional configuring 525 may include the user selecting which colors to use for DUIs differing in intensity, i.e., the amount of utility associated with the individual DUIs for all points in the IGR having associated DUIs. For example, the user may select red for DUIs having an extremely high DUI, and blue for DUIs having a low DUI, and other colors in between these extreme colors for DUIs or intermediate utility. Similarly, the user may select the size of the point to correlate to the intensity of the DUI associated with the point. For instance, large bars, dots, circles, squares or peaks may be used for points having DUIs that have a high intensity, which means that the associated DUIs for these points have been particularly useful to previous readers of the chosen electronic document. In addition, configuring 520 may include the user selecting thresholds for the points having DUIs that are to appear with the IGR. For instance, the user configure 520 the thresholds to show only the top five DUIs, wherein the top five DUIs correspond to the five parts of the electronic document that previous readers found most useful, as determined by the parts associated DUIs. Another threshold example is for the user to configure 520 for the appearance of DUIs equal to or above a minimum threshold level specified by the user.

Flowchart 500 continues by another decision block 530 querying whether to configure the selecting functionality. As with the configuring decision block 520, if a user elects not to configure the selecting as illustrated by decision block 530, then the user accepts the default selection configuration possibly chosen by a system administrator. However, if the user answers yes to configuring the selecting decision block 530, then configuring 535 the selecting functionality ensues.

Configuring 535 the selecting functionality occurs through enabling logic, whether reduced to hardware and/or found in code, associated with one or more modules providing the user with selective capability for determining how to select parts and points associated with the IGR. Configuring 535 the selecting may include the user deciding whether viewing of DUIs associated with points on the IGR occurs with a single click of a selecting device, such as a mouse, and/or occurs by textual entry through a selecting device, such as a keyboard. Further, the configuring 535 may include the user deciding whether the selecting occurs through selecting choices offered in a drop-down or pop-up menu associated with the points and parts of the IGR. Further still, the configuring 535 may include the user deciding whether to enable a toggler for toggling forward and/or backward among the points having associated DUIs on the IGR. Configuring 535 the toggler, for instance, may further include the user deciding whether right-clicking with a mouse on or near a point opens a window to display the DUI associated with that point on the IGR, and if double right-clicking on the same point is to be a user's command to open the electronic document to that part of the electronic document associated with that point. Additional configuring 535 may include the user deciding whether magnifying a particular section of the IGR occurs by the user, for instance, right-mouse clicking on a point of the IGR, and while still depressed, dragging the mouse to another point on the IGR, whereby this action operates to magnify this section that appears in another window. In this manner, a particularly crowded section of the IGR is magnified so that the granularity of this section is more easily viewed by the user.

Moving on, the flowchart 500 continues by displaying 540 the IGR with the DUIs as directed by the configuring 520 or in the default configuration established, for example, by a system administrator. The displaying 540 occurs through associated, enabling logic translating the chosen electronic document into the IGR having points, wherein each point on the IGR corresponds to a different part of the electronic document. Further, the displaying 540 includes associating each of the DUIs with the point to which each of the DUIs pertains. After displaying 540 the IGR with the DUIs, the flowchart 500 continues by a user selecting 550, with a selecting device, on at least one point of the IGR, wherein further enabling logic instantly opens 560 the electronic document on the user's viewer to the part of the electronic document selected by the selecting device. Thereafter, the flowchart 500 ENDs 580 if the user's answer to the bookmarking decision block 570 is no.

If, however, the user elects to bookmark 575 one or more points on the IGR, then this corresponds to the user electing to bookmark the one or more parts of the electronic document corresponding to these one or more points that the user finds particularly useful. Associated enabling logic for bookmarking 575 may include the user using the selecting device by right-mouse clicking on a point on the IGR, and choosing an option to bookmark from a pop-up menu. The actual notation of this user's bookmark 575 of a certain point on the IGR may occur by writing this bookmark to a copy of the DUIs received by and possibly stored in memory on the server or on the user's computer. At the end of the user's interaction with the IGR, enabling logic, found in software and/or hardware on the server, may call for the user's computer's copy of the DUIs now having the user's one or more bookmarks for the particular electronic document. The server will store the user's received copy of the bookmarked DUIs for the particular electronic document. As a result, when the user communicates at a later time with the server, then the user may optionally access bookmarked parts of the same electronic document by selecting one of the bookmarks. After the user performs the optional bookmarking 575, the flowchart 500 ENDs 580.

Another embodiment of the invention is implemented as a program product for use with a system such as, for example, system 400 as shown in FIG. 4. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for selectively accessing one or more parts of an electronic document by user-initiated action, the method comprising:

selecting the electronic document on a computer system having executable memory;

receiving document utilization information for the electronic document, wherein the document utilization information comprises information about parts of the electronic document, wherein the information is selected from a type comprising utility, usage based on history, and inserted commentary from one or more past users;

generating an interactive graphical representation, wherein a point of the interactive graphical representation correlates to only one part of the electronic document, and wherein the point has an appearance directly corresponding to an amount of the information associated with the point, and further wherein the appearance is selected from a type comprising size, height, and color;

displaying the document utilization information as the interactive graphical representation;

selecting, in response to the displaying, at least one point on the interactive graphical representation; and displaying, to a user, the part of the electronic document associated with the point selected in response to the generating.

2. The method of claim 1, further comprising configuring the interactive graphical representation for the displaying of the document utilization information.

3. The method of claim 1, further comprising bookmarking the at least one point.

4. The method of claim 1, wherein the displaying of the document utilization information comprises displaying the document utilization information associated with one of the parts of the electronic document upon moving a selecting device within at least a proximal distance to the at least one point on the interactive graphical representation associated with the one of the parts.

5. The method of claim 1, wherein the displaying of the document utilization information comprises magnifying at least one section of the interactive graphical representation in order to increase granularity.

6. The method of claim 1, wherein the selecting of the at least one point comprises moving a selecting device over the interactive graphical representation, and clicking, with the selecting device, on the at least one point.

7. The method of claim 1, wherein the selecting of the at least one point comprises toggling onto the at least one point.

8. A system for selectively accessing one or more parts of an electronic document by user-initiated action, the system comprising:

one or more applications operable on a computer system having executable memory;

an access module, in communication with the one or more applications, receiving document utilization information for the electronic document, wherein the document utilization information comprises information about parts of the electronic document, wherein the information is selected from a type comprising utility, usage based on history, and inserted commentary from one or more past users;

a display module, in communication with the access module, for selecting the electronic document, for generating an interactive graphical representation, wherein a point of the interactive graphical representation correlates to only one part of the electronic document, and wherein the point has an appearance directly corresponding to an amount of the information associated with the point, and further wherein the appearance is selected from a type comprising size, height, and color, and for displaying the document utilization information as the interactive graphical representation;

an input module, in communication with the display module, for selecting at least one point on the interactive graphical representation; and a visualization module, in communication with the input module, for displaying, to a user on a computer, the part of the electronic document associated with the at least one point selected.

9. The system of claim 8, further comprising a configuration module, in communication with the display module, for configuring the interactive graphical representation and the document utilization information.

10. The system of claim 8, further comprising a bookmark module for bookmaking the at least one point.

11. The system of claim 8, wherein the input module further comprises a selection module for configuring the selecting device.

12. The system of claim 8, wherein the document utilization information comprises an indication of a useful part of the electronic document.

13. The system of claim 8, wherein the display module for displaying the interactive graphical representation comprises displaying points of the electronic document as a bar graph and displaying any document utilization information for each of the points adjacent to each of the each of the points.

14. The system of claim 8, wherein the display module for displaying the interactive graphical representation comprises displaying a colorized, interactive graphical representation, wherein each has one or more pixels having a color correlating to an intensity of the document utilization information for each part of the electronic document.

15. A computer-readable storage medium, which when executed by a computer memory, would cause the computer to selectively access one or more parts of an electronic document, comprising:

selecting the electronic document on a computer system having executable memory;

receiving document utilization information for the electronic document, wherein the document utilization information comprises information about parts of the electronic document, wherein the information is selected from a type comprising utility, usage based on history, and inserted commentary from one or more past users;

generating an interactive graphical representation, wherein a point of the interactive graphical representation correlates to only one part of the electronic document, and wherein the point has an appearance directly corresponding to an amount of the information associated with the point, and further wherein the appearance is selected from a type comprising size, height, and color;

displaying the document utilization information as the interactive graphical representation;

selecting, in response to the displaying, at least one point on the interactive graphical representation; and displaying, to a user, the part of the electronic document associated with the point selected in response to the generating.

16. The computer-readable storage medium of claim 15, further comprising configuring the interactive graphical representation for the displaying of the document utilization information.

17. The computer-readable storage medium of claim 15, further comprising bookmarking the at least one point.

18. The computer-readable storage medium of claim 15, wherein the displaying of the document utilization information comprises displaying the document utilization information associated with one of the parts of the electronic document upon moving a selecting device within at least a proximal distance to the at least one point on the interactive graphical representation associated with the one of the parts.

19. The computer-readable storage medium of claim 15, wherein the displaying of the document utilization information comprises magnifying at least one section of the interactive graphical representation in order to increase granularity.

20. The computer-readable storage medium of claim 15, wherein the selecting comprises selecting upon moving the selecting device over the interactive graphical representation, and selecting upon clicking, with a selecting device, on at least one of the points.

* * * * *